United States Patent [19]

Tung

[11] Patent Number: 5,047,484

[45] Date of Patent: Sep. 10, 1991

[54] TAPERED BLOCK COPOLYMERS

[75] Inventor: Lu H. Tung, Midland, Mich.

[73] Assignee: The Dow Chemical Company, Midland, Mich.

[21] Appl. No.: 440,850

[22] Filed: Nov. 24, 1989

[51] Int. Cl.$^5$ .............................................. C08F 8/04
[52] U.S. Cl. ................................ 525/314; 525/332.9; 525/330; 525/339
[58] Field of Search ............................. 525/314, 332.9

[56] References Cited

U.S. PATENT DOCUMENTS 3,431,323  3/1969  Jones .
3,507,934  4/1970  Minor et al. .
3,700,633  10/1972 Wald et al. .
3,792,127  2/1974  Gillies .

FOREIGN PATENT DOCUMENTS 316857  5/1989  European Pat. Off. .

Primary Examiner—Bernard Lipman

[57] ABSTRACT

Tapered block copolymers of monovinylidene aromatic monomers and conjugated diene monomers having an isolated polymerized monovinylidene atomatic content of from 30 to 75 percent, hydrogenated derivatives thereof and a process for their preparation.

13 Claims, No Drawings

TAPERED BLOCK COPOLYMERS

BACKGROUND OF THE INVENTION

The present invention relates to tapered block copolymers. More particularly the present invention relates to such tapered block copolymers having improved melt flow and other properties particularly when hydrogenated.

Block copolymers, particularly block copolymers of monovinylidene aromatic monomers and conjugated dienes are well known in the art. Such polymers have found numerous uses as elastomers, as components of adhesives, and as impact modifying additives for numerous engineering thermoplastic resins. Hydrogenated block copolymers are also previously known in the art. Such hydrogenated block copolymers are frequently desired where stability and ultraviolet light degradation resistance are important. Frequently exterior applications such as impact modification of thermoplastic resins to be exposed to outdoor conditions require the use of a hydrogenated block copolymer. Numerous techniques for hydrogenation of block copolymers are known in the art and are taught for example in U.S. Pat. Nos. 3,333,024; 3,595,942; 3,868,354; 3,872,072; 3,988,504; 4,501,857; and 4,673,714.

Conventional, hydrogenated, untapered, block copolymers have been found to have an extremely high melt viscosity as measured by melt index and accordingly such hydrogenated, untapered, block copolymers have been found to be fabricated into useful objects only with great difficulty. Such difficulties in the use of hydrogenated block copolymers have been previously recognized in the art. In U.S. Pat. No. 3,507,934 an attempt to reduce the melt viscosity of such block copolymers by broadening the molecular weight distribution of the monovinylidene block is disclosed. In U.S. Pat. No. 3,700,633 a block copolymer is disclosed wherein the conjugated diene block was replaced with a completely random copolymer of a monovinylidene aromatic monomer and a conjugated diene (specifically styrene and butadiene). The resulting polymers achieved only a limited improvement in viscosity properties.

In U.S. Pat. No. 3,792,127 a further effort to reduce melt viscosity of hydrogenated block copolymers by addition of a small quantity of a random monovinylidene aromatic/conjugated diene polymer block to otherwise standard block copolymers is disclosed. The resulting polymers likewise fail to achieve significant improvement in melt viscosity properties.

U.S. Pat. No. 3,431,323 taught that triblock copolymers of styrene-butadiene-styrene should incorporate between 35 and 55 percent 1,2-vinyl functionality in the polybutadiene block to result in desirable elastomeric properties for the hydrogenated polymer. Such 1,2-vinyl functionality indicates the presence of pendant side chains or a branched structure in the resulting hydrogenated polymer.

For the teachings contained therein the foregoing U.S. patents are incorporated herein in their entirety by reference thereto.

However, it has now been discovered that if certain randomizing agents are used to produce the desired quantity of 1,2-vinyl functionality in tapered, styrene-butadiene-styrene triblock copolymers, particularly tetrahydrofuran, the taperness of the resulting polymer is adversely affected. That is, in order to produce block copolymers having reduced melt viscosity, it has not been previously possible to attain a desired 1,2-vinyl content.

It would be desirable if there were provided a hydrogenated, tapered, styrene-butadiene-styrene triblock copolymer having improved melt viscosity.

In addition, it would be desirable if there were provided a hydrogenated, tapered, styrene-butadiene-styrene triblock copolymer having improved melt viscosity wherein the 1,2-vinyl content of the polybutadiene block of the copolymer before hydrogenation is from 35 to 55 percent based on total ethylenic unsaturation in the polybutadiene block, most preferably 40–50 percent.

Finally, it would be desirable if there were provided a process for preparing tapered, styrene-butadiene-styrene triblock copolymer having both a desired range of isolated styrene content to provide improved melt viscosity and a desired range of 1,2-vinyl functionality such that the resulting polymer after hydrogenation possesses good elastomeric properties.

SUMMARY OF THE INVENTION

According to the present invention there is provided a hydrogenated, tapered block copolymer corresponding to the formula $AB(BA)_n$ wherein A is a block of a monovinylidene aromatic monomer and B is a partially or fully hydrogenated block of a conjugated diene, and n is a number from 0 to 6, said block copolymer being further characterized in that at least one of the junctions between an A block and a B block is tapered such that the total amount of isolated, polymerized monovinylidene aromatic units in the polymer is from 30 to 75 percent (based on total vinyl aromatic monomer units). In a further embodiment of the invention the weight average molecular weight of the block copolymer is from 50,000 to 250,000 and the weight ratio of A:B in the block copolymer is from 1:5 to 1:0.2.

In another embodiment of the present invention, there is provided a tapered block copolymer corresponding to the formula $AB(BA)n$ wherein A is block of a monovinylidene aromatic monomer and B is a block of butadiene, an n is a number from 0 to 6, said block copolymer being further characterized in that at least one of the junctions between an A block and a B block is tapered such that the total amount of isolated, polymerized monovinylidene aromatic units in the polymer is from 30 to 75 percent (based on total vinyl aromatic monomer units) and the 1,2-vinyl content of the polybutadiene block of the copolymer is from 35 to 55 percent, most preferably 40 to 50 percent, based on total ethylenic unsaturation. The weight average molecular weight of the block copolymer is preferably from 50,000 to 250,000 and the weight ratio of A:B in the block copolymer is from 1:5 to 1:0.2.

In a final embodiment, there is provided a process for preparing a tapered, block copolymer, the steps of the process comprising polymerizing a monovinylidene aromatic monomer and a conjugated diene under anionic polymerization conditions in the presence of a suitable randomizing agent to prepare a tapered block copolymer corresponding to the formula $AB(BA)_n$ wherein A is a block of a monovinylidene aromatic monomer and B is a block of butadiene, and n is a number from 0 to 6, said block copolymer being further characterized in that at least one of the junctions between an A block and a B block is tapered such that the total amount of isolated, polymerized monovinylidene aromatic units in the polymer is from 30 to 75 percent (based on total vinyl aromatic monomer units) and the 1,2-vinyl content of the polybutadiene block of the copolymer is from 35 to 55 percent.

It has been surprisingly discovered that the foregoing block copolymers, especially the hydrogenated form thereof, have greatly improved melt viscosity properties making such polymers eminently suitable for use in the preparation of adhesives and molding compounds. In addition the hydrogenated block copolymers of the present invention are highly useful as thermoplastic resins in order to produce weatherable high clarity thermoplastic objects.

DETAILED DESCRIPTION OF THE INVENTION

Block copolymers and techniques for their preparation are extremely well known in the art. Such polymers are prepared by anionic polymerization utilizing lithium alkyl initiators, such as n-butyl lithium, sec-butyl lithium, etc. Particularly preferred block copolymers are triblock polymers, ie. block copolymers of the foregoing formula wherein $n=1$. These triblock copolymers may be prepared by using soluble difunctional lithium initiators such as 1,3-phenylene-bis(3-methyl-1-phenyl-pentylidene)-bis-(lithium), or similar initiator as are disclosed in U.S. Pat. No. 4,196,154, the teachings of which are incorporated herein by reference. Additionally suitable techniques for the preparation of block copolymers comprise sequential polymerization of the various blocks followed by coupling using a multifunctional coupling agent. Preferred monovinylidene aromatic monomers for use according to the present invention include styrene, ring alkylated styrenes and α-alkyl substituted styrenes, particularly α-methylstyrene. A most preferred monovinylidene aromatic monomer is styrene. Suitable conjugated dienes include butadiene and isoprene, preferably butadiene.

Tapered block copolymers are those wherein a junction between one polymer block is allowed to progressively change from a polymer that is substantially a homopolymer of one monomer to a polymer that is substantially a homopolymer of the other comonomer. The degree of taperness can be readily ascertained by the degree of isolated monovinylidene aromatic monomer units as a percentage of total monovinylidene aromatic monomer. Such isolated monovinylidene aromatic monomer units are those surrounded on both sides by conjugated diene polymer units and are easily determined by the use of nuclear magnetic resonance spectroscopy as disclosed in Mochel, Rubber Chemistry and Technology, v40, p. 1200 (1967).

The tapered portion of a block copolymer is easily prepared by adding gradually increasing quantities of one comonomer during the period of polymerization of the other comonomer, particularly after allowing a short period of time for a homopolymer of the original comonomer to be formed. Alternatively, in the preparation of most monovinylidene aromatic/conjugated diene block copolymers, a mixture of the two monomers may be initiated and allowed to polymerize. Due to the copolymerization kinetics when both a monovinylidene aromatic monomer and a diene monomer are reacted under anionic polymerization conditions the conjugated diene monomer is more readily polymerizable than the monovinylidene aromatic monomer, and an essentially pure block of the conjugated diene polymer is initially formed. As the polymerization continues, increasingly greater reaction of the monovinylidene aromatic monomer takes place, resulting in the formation of a tapered block copolymer.

Suitable randomizing agents may also be added to the polymerization mixture at appropriate times particularly where butadiene monomer is polymerized to control the degree of taperness of the copolymers. By selection of an appropriate randomizing agent and quantity used the skilled artisan may control the isolated styrene content of the block copolymer within the range desired to provide improved viscosity properties and at the same time maintain the content of 1,2-vinyl functionality in the resulting polybutadiene block within the previously mentioned range of 35 to 55 mole percent. Preferred randomizing agents are tertiary amine compounds, especially aliphatic diamines and triamines. A most preferred randomizing agent is N,N,N',N',N'' pentamethyldiethylamine.

In addition to factors previously mentioned with regard to preparing block copolymers having the desired 1,2-vinyl- and isolated styrene contents, it should be noted that other factors may also affect ultimate block copolymer properties. For example, if only one junction of a triblock copolymer is tapered (resulting in what is called a half-tapered block copolymer), the resulting polymer's properties are generally exceptionally good.

Once the block copolymer has been prepared it may be coupled if desired and the polymerization is terminated usually by the addition of a reactive terminator such as an alcohol. Additional additives can be present in the reaction to control the molecular weight distribution of the polymer or for any other purpose. The use of amine additives as disclosed in pending U.S. patent application Ser. No. 352,670, filed May 9, 1989 now U.S. Pat. No. 4,960,842 in combination with the aforementioned hydrocarbon soluble difunctional initiators is especially desirable to prepare extremely narrow molecular weight block copolymers.

After its recovery, the tapered block copolymer may be hydrogenated by the use of any suitable homogeneous or heterogeneous hydrogenation catalyst and a suitable hydrogenation agent such as hydrogen gas. Preferred catalysts include copper or noble metal containing heterogeneous hydrogenation catalysts. While any degree of hydrogenation may be suitably employed it is most preferable that from 50 percent to 100 percent of the hydrogenatable ethylenic unsaturation remaining in the conjugated diene block be hydrogenated by the hydrogenation process employed. Most preferably, the aromatic unsaturation of any monovinylidene aromatic monomer units is substantially unaffected by the hydrogenation process. Highly preferred polymers according to the present invention have from 75 percent to 100 percent of the residual ethylenic unsaturation hydrogenated while from 0 to 15 percent of the aromatic functionality is hydrogenated. In a most preferred embodiment of the present invention, the degree of taperness of the block copolymers is from 45 to 70 percent. Such polymers additionally preferably have a melt index (ASTM D1238-82 condition 200/5-0) from 1 to 40, most preferably from 2 to 15.

Having described the invention the following examples are provided as further illustrative and are not to be construed as limiting. Unless stated to the contrary, all parts and percentages are based on weight.

EXAMPLE 1

To a nitrogen purged 2 liter air-tight stirred reactor, 1400 mL purified cyclohexane was added. To the same vessel, 230 mL of purified 1,3-butadiene and 70.1 mL of purified styrene were added. A 60 mL portion of the mixture was withdrawn to a 100 mL nitrogen blanketed flask and titrated with the intensely dark red difunctional organolithium initiator 1,3-phenylenebis(3-methyl-1-phenylpentylidene)-bis-(lithium) in toluene solution for the residual impurity concentration level in the reaction mixture. Based on the titration 0.195 millimoles of a s-butyllithium solution was added to the main body of the reaction mixture to blank out the remaining impurities. The temperature control of the reactor was then set at 45° C. When the temperature of the reaction mixture reached 40° C., 0.84 millimoles of N,N,N',N', N''-pentamethyl diethylene triamine (PMDETA) and 2.8 millimoles of a difunctional organolithium initiator, 1,3-phenylene-bis(3-methyl-1-phenylpentylidene)-bis-(lithium), in toluene were added to initiate the polymerization. This difunctional organolithium initiator was prepared as described in U.S. Pat. No. 4,196,154. The temperature of the reaction mixture rose to about 80° C. in about 16 minutes after initiation. Shortly thereafter the faint yellow solution turned to a more intense red color. Afterwards the temperature started to subside. The polymerization was allowed to proceed for 20 minutes after the color change and then was terminated by the addition of isopropyl alcohol. The tapered SBS triblock polymer was recovered by vacuum drying at low temperature after 3 g of 2,6-ditertiary butylphenol stabilizer. The weight average molecular weight determined by gel permeation chromatography (GPC) was 77,600. Proton NMR spectrum indicated that the polymer had 68.6 percent polybutadiene, 44.6 percent of which formed a 1,2 vinyl structure. The isolated styrene calculated from the proton NMR spectrum by the method or Mochel was 65.3 percent of the total styrene present.

The recovered tapered SBS was then redissolved in cyclohexane in concentration at about 15 grams in 200 mL. Hydrogenation was carried out with a hydrogen atmosphere at 80°-90° C. using as a catalyst Pt supported on diatomaceous earth (Johns Manville Celite ® F.C.). The product had 89.7 percent of the olefinic double bond and 12.1 percent of the hydrogenated and had a snappy elastomeric property. The tensile rupture strength measured was 759 psi at 900 percent elongation. Its melt index (condition 200/5.0 ASTM method D1238-82) was 39.

COMPARATIVE A

Example 1 was repeated except that styrene monomer was not added at the start of the polymerization. Instead it was added 30 minutes after initiation to give a polymer block with reduced taperness as measured by reduced isolated styrene. Before the addition of styrene the exothermic peak reached a high of 67° C. Styrene was added when the temperature receded to about 60° C. After the addition of styrene the temperature rose again and reached another maximum of about 65° C. in about 25 minutes. The polymerization was allowed to proceed for 20 minutes thereafter and then was terminated by the addition of isopropyl alcohol. The weight average molecular weight determined by GPC was 72,000. Proton NMR spectrum indicated that the polymer had 68.2 percent butadiene and 45.4 percent of which formed 1,2 vinyl. The isolated styrene calculated from the proton NMR spectrum by the method or Mochel was 23.6 percent of the total styrene present.

After hydrogenation according to the technique of Example 1 the resulting block copolymer had 90.7 percent of the olefinic double bond hydrogenated and 8.1 percent of the aromatic functionality hydrogenated. The polymer had comparable molecular weights and composition as that in Example 1 but had a melt index of 0. The melt viscosity was too high to be extruded out of the capillary of the melt index tester.

COMPARATIVE B

The polymerization procedure of Example 1 was repeated except that 48 millimoles of tetrahydrofuran was used in place of the 0.84 millimoles of PMDETA. The final tapered styrene-butadiene-styrene block copolymer was analyzed and found to have a 1,2-vinyl content of 36.2% with 81.1% isolated styrene. The 1,2-vinyl content was just within the acceptable range but isolated styrene content was too high.

EXAMPLE 2

Example 1 was repeated except that the step of titrating for residual impurities was omitted. The amount of butadiene used was 142 g, styrene was 61.2 g, PMDETA was 0.68 millimole and the initiator 2.27 millimole. The resulting tapered triblock as a butadiene content of 66.1 percent with 44.4 percent 1,2-vinyl. The isolated styrene by NMR was 72.2 percent. The weight average molecular weight by GPC was 97,500. After hydrogenated in a similar manner to that of Example 1, the resulting tapered hydrogenated block copolymer had a melt index of 11.3 and a tensile rupture strength of 1929 psi at 810 percent elongation.

EXAMPLE 3

73 g of butadiene was polymerized substantially according to the technique of Example 2. Five minutes after the temperature reached an exothermic peak, 70,8 g more butadiene was added followed immediately with 67.6 mL styrene. The polymerization was allowed to proceed 30 more minutes after the reaction mixture turned to the reddish polystyrene lithium color. The recovered polymer had 64.9 percent polymerized butadiene with 39.2 percent 1,2-vinyl content. The isolated styrene content was 53.7 percent of total styrene content. Upon hydrogenation 61 percent of the olefinic double bonds and 5 percent of the aromatic functionality were saturated. This hydrogenated block copolymer had a melt index of 6.7 and a tensile rupture strength of 2364 psi at 700 percent elongation.

EXAMPLE 4

Cyclohexane (675 mL) isoprene (70 g) and styrene (30 g) were added to a nitrogen blanketed Parr reactor equipped with a helical agitator. The reaction mixture was heated from room temperature by setting the temperature control of the reactor to 50° C. When the temperature during heating reached 45° C., 1.4 millimoles of the difunctional lithium initiator was added. The reaction was continued until 70 minutes after exothermic peak temperature. After the reaction mixture was terminated with isopropyl alcohol, 2/3 of the contents of the reactor were drained and the tapered styrene-isoprene-styrene block copolymer was recovered. Analysis of the block copolymer showed that it had an isolated styrene content of 48.1% and a number average molecular weight of 92,000.

The remaining ⅓ of the polymer in cyclohexane solution was diluted further with cyclohexane to a concentration of approximately 5%. A nickel octoate/triethylaluminum complex catalyst was used to hydrogenate the triblock at 65° C. for 24 hours. The recovered polymer had 85% of the olefinic double bonds hydrogenated and 8% of the aromatic functionality hydrogenated.

What is claimed is:

1. A hydrogenated, tapered, block copolymer corresponding to the formula $AB(BA)_n$ wherein A is a block of a monovinylidene aromatic monomer and B is a partially or fully hydrogenated block of a conjugated diene, and n is a number from 0 to 6, said block copolymer being further characterized in that at least one of the junctions between an A block and a B block is tapered such that the total amount of isolated, polymerized monovinylidene aromatic units in the polymer is from 30 to 75 percent, said block copolymer having a melt index from 1 to 40.

2. A hydrogenated, tapered, block copolymer according to claim 1 wherein the weight average molecular weight of the block copolymer is from 50,000 to 250,000 and the weight ratio of A:B is from 1:5 to 1:0.2.

3. A hydrogenated, tapered, block copolymer according to claim 1 wherein the monovinylidene aromatic monomer is styrene and the conjugated diene monomer is butadiene.

4. A hydrogenated, tapered block copolymer according to claim 1 wherein the melt index is from 2 to 15.

5. A hydrogenated, tapered, block copolymer according to claim 1 wherein the percentage of ethylenic unsaturation that is hydrogenated is from 50 to 100 percent.

6. A hydrogenated, tapered, block copolymer according to claim 1 wherein n is 1.

7. A hydrogenated, tapered, block copolymer according to claim 1 wherein the total amount of isolated, polymerized monovinylidene aromatic monomer units is from 45 to 70 percent.

8. A block copolymer corresponding to the formula $AB(BA)_n$ wherein A is a block of a monovinylidene aromatic monomer and B is a block of butadiene, and n is a number from 0 to 6, said block copolymer being further characterized in that at least one of the junctions between an A block and a B block is tapered such that the total amount of isolated, polymerized monovinylidene aromatic units in the polymer is from 30 to 75 percent and the 1,2-vinyl content of the polybutadiene block of the copolymer is from 35 to 55 percent, said block copolymer having a melt index from 1 to 40.

9. A block copolymer according to claim 8 wherein the weight average molecular weight of the block copolymer is from 50,000 to 250,000 and the weight ratio of A:B is from 1:5 to 1:0.2.

10. A block copolymer according to claim 9 wherein the monovinylidene aromatic monomer is styrene and the conjugated diene monomer is butadiene.

11. A block copolymer according to claim 9 wherein the melt index is from 1 to 40.

12. A block copolymer according to claim 9 wherein the isolated polymerized monovinylidene aromatic monomer units are from 45 to 70 percent.

13. A block copolymer according to claim 9 wherein the 1,2-vinyl content is from 40 to 50 percent.

* * * * *